(12) United States Patent
McCowin et al.

(10) Patent No.: US 8,276,711 B1
(45) Date of Patent: Oct. 2, 2012

(54) SOUND BARRIER WALL

(75) Inventors: Stephen McCowin, Leesburg, VA (US); Paul Ogorchock, Virginia Beach, VA (US)

(73) Assignee: Concrete Innovation Services, Chantilly, VA (US)

( * ) Notice: Subject to any disclaimer, the term of this patent is extended or adjusted under 35 U.S.C. 154(b) by 0 days.

(21) Appl. No.: 13/534,849

(22) Filed: Jun. 27, 2012

Related U.S. Application Data

(62) Division of application No. 12/928,675, filed on Dec. 17, 2010, now Pat. No. 8,230,970.

(51) Int. Cl.
*E04B 1/82* (2006.01)
*E04B 1/84* (2006.01)
*E04B 5/04* (2006.01)
*E04C 1/00* (2006.01)
*E04C 2/04* (2006.01)
*E04H 17/00* (2006.01)
*F01N 5/00* (2006.01)

(52) U.S. Cl. ......... 181/294; 52/144; 52/309.12; 52/612; 181/210; 181/211; 181/286; 181/290

(58) Field of Classification Search .................. 181/294, 181/290, 210; 52/144
See application file for complete search history.

(56) References Cited

U.S. PATENT DOCUMENTS

| | | | | | |
|---|---|---|---|---|---|
| 3,948,830 | A | * | 4/1976 | Donnelly et al. | 523/401 |
| 4,325,457 | A | * | 4/1982 | Docherty et al. | 181/210 |
| 5,203,629 | A | * | 4/1993 | Valle et al. | 366/2 |
| 5,272,284 | A | * | 12/1993 | Schmanski | 181/210 |
| 5,438,171 | A | * | 8/1995 | Schmanski | 181/210 |
| 5,564,241 | A | * | 10/1996 | Ogorchock et al. | 52/309.12 |
| 5,678,363 | A | * | 10/1997 | Ogorchock et al. | 52/144 |
| 5,713,161 | A | * | 2/1998 | Veldhoen | 52/144 |
| 6,264,740 | B1 | * | 7/2001 | McNulty, Jr. | 106/817 |
| 6,827,179 | B2 | * | 12/2004 | Drake et al. | 181/290 |
| 7,625,960 | B2 | * | 12/2009 | Garner | 524/5 |
| 7,637,062 | B2 | * | 12/2009 | Rerup | 52/144 |
| 8,038,790 | B1 | * | 10/2011 | Dubey et al. | 106/675 |
| 8,066,097 | B2 | * | 11/2011 | Boyadjian et al. | 181/290 |
| 8,230,970 | | * | 7/2012 | McCowin et al. | 181/294 |
| 2007/0125273 | A1 | * | 6/2007 | Pinto | 106/638 |
| 2009/0011207 | A1 | * | 1/2009 | Dubey | 428/219 |
| 2009/0277717 | A1 | * | 11/2009 | Drouin | 181/294 |
| 2010/0273902 | A1 | * | 10/2010 | Ladely et al. | 521/55 |
| 2011/0192100 | A1 | * | 8/2011 | Tonyan et al. | 52/232 |

\* cited by examiner

*Primary Examiner* — David Warren
*Assistant Examiner* — Christina Russell
(74) *Attorney, Agent, or Firm* — The Marbury Law Group, PLLC

(57) ABSTRACT

A method of forming a monolithically fabricated sound absorbing structural precast concrete noise barrier panel comprising a sound absorbing layer of specialized raw materials. The method includes providing a sound absorbing layer that is a blended mixture of an aggregate, granulated rubber, chemically treated wood particles, cement, pozzolans, water, air entraining admixture, and water reducing mixture; placing the sound absorptive layer ingredients in a form mold; compressing the ingredients to a preset density; backing the compressed ingredients with reinforced structural concrete; and curing the backed and compressed ingredients.

1 Claim, No Drawings

SOUND BARRIER WALL

The present application is a divisional of and claims priority to U.S. patent application Ser. No. 12/928,675, filed Dec. 17, 2010, the entire contents of which are hereby incorporated by reference.

TECHNICAL FIELD OF THE INVENTION

Background of the Invention

Since the advent of complex motorized transportation systems, such as railroads, automobiles and airplanes, there has been a need to reduce or prevent noise caused by such systems from effecting surrounding neighborhoods and businesses. As highways increasingly are compelled to traverse residential areas, hospital zones and even industrial areas in which silence is a virtue, a problem arises with respect to the noise generated by the vehicles traveling on such highways. The problem is particularly pronounced as vehicle size increases and vehicle speed increases both for heavy vehicles and light vehicles.

Not only does the sound generated by traveling vehicles rank as an inconvenience to neighbors of such highways, but there is increasing evidence that continuous high noise levels associated with vehicle travel are detrimental to the health of individuals who dwell or work in the vicinity of highways, throughways, heavily traveled streets and avenues, and even carparks where both engine starting and wheel noise may be significant.

As such, in a growing number of transportation related settings, federal, state and local governments are specifying, supplying and installing sound barriers between roadways and the surrounding areas, particularly in areas of high traffic volume. Sound barriers are desirable in residential and commercial areas proximate interstate highways to attenuate noise in neighborhoods, shopping districts, and other commercial areas caused by traffic.

Therefore, there is a need for a noise barrier wall that has a high noise reduction coefficient yet also has a high sound transmission coefficient. Consequently, a number of devices and systems have been created which have been somewhat effective in alternating such noise.

Various materials are presently employed in the design and manufacture of various sound barriers. Prior art barrier designs constructed of steel, concrete, cement board, wood, and earthen barriers have been employed to effect a reduction of ambient noise levels proximate noisy roadways or construction sites. However, each have various disadvantages that make widespread production and installation impractical, either due to cost, manufacture and installation complexity, or poor sound attenuation.

Common barriers such as fences constructed of wood or a similar lightweight material probably served as the first noise barriers. While effective in preventing sight access, such barriers are quite ineffective in preventing the transmission of sound waves. Steel and metal barriers are prone to denting and chipping, as well as corrosion, and are extremely heavy. Wood barriers require periodic maintenance and have a comparatively short useful life. Concrete> barriers are very expensive to produce and install. Earthen barriers require a great deal of space to erect and are subject to erosion over time. Furthermore, each of these barrier designs requires labor intensive installation techniques, thereby placing a premium on product life. Additionally, none of the aforementioned barrier designs are particularly aesthetically pleasing, and all are susceptible to the application of graffiti and the like.

Therefore, there is a need for a sound barrier that is durable.

Concrete or masonry barriers and barriers constructed of a similar heavy material are perhaps more commonly used in attempting to prevent noise transmission. Barriers constructed of concrete are far superior to wood structures in accomplishing this goal, and yet it has been determined that concrete barriers and the like tend more to reflect sound waves rather than to dampen or absorb the same. Hence, while these types of barriers seem to be suitable for the accomplishment of some tasks along a highway or railroad track, they leave much to be desired in the area of preventing sound wave from being redirected or reflected onto people living in areas opposite a noise barrier wall installation.

Additionally, the installation of many prior art sound barriers requires an excess of installation hardware and complex mechanical hardware for assembling the barrier panels. Concrete and steel barriers require heavy equipment to place the barriers, and robust structural supports to hold the barriers in place due to their weight. Furthermore, the labor required to construct these barrier systems is quite costly.

Since many sound barriers are located adjacent to high speed motorways, there is a considerable possibility of impact between the barrier and a vehicle that is traveling at high speeds. As such, there is a possibility of damage to the barrier, which can cause considerable expense to correct. Furthermore, these structures are exposed to the elements, and as such, are susceptible to damage due to hail, as well as to freeze/thaw cycles. Again, repair of such damage can be quite expensive.

Therefore, there is a need for a sound barrier that is durable yet is economical to construct and erect, as well as to maintain.

Still further, since some of these structures are located near residential areas, fire may be a consideration both to protect the structures themselves as well as to protect nearby structures.

Therefore, there is a need for a sound wall that has a good fire rating.

Lately, much experimentation has been done with barriers having extruded members, particularly those which are modularly connected together, some of which are constructed of thermoplastic materials which absorb rather than deflect sound waves. Such structures may be effective in dampening much of the noise generated by highway traffic, locomotives, airplanes, and the like, although these barriers are not as effective as desirable. Furthermore, many of these barriers are constructed of materials which break down quickly or lose their resiliency when subjected to adverse conditions such as extreme weather and high-velocity impacts with foreign objects.

Some sound barriers use large quantities of rubber shavings contained within a hollow fiberglass panel in an effort to reduce sound reflection and/or transmission. However, it has been found that these structures are vulnerable to damage caused by changing weather conditions and vandalism. This type of barrier becomes a fire hazard in the event a vehicle crashes into the wall and spills fuel onto the wall.

Since sound barriers are often used to protect residential areas, hospitals, schools, and housing developments from high noise areas like roadways, construction sites, and shopping centers, the design and construction of economical and easily installed barriers is of particular import to quality of life in the modern world. Consequently, aesthetic appeal of such barriers has become a significant element in the design of such structures.

Therefore, there is a need for a sound wall that can be constructed in a manner that is aesthetically pleasing.

Still further, in any sound wall that has a sound absorbing layer bonded to a structural unit, the bond between the sound absorbing layer and the structural concrete layer is very critical. If the bond between the sound absorbing layer and the structural concrete layer is weak, the sound absorbing layer can dislodges from the structural concrete layer. Failure of the bond is dangerous because large pieces of the sound absorbing layer fall and endanger the general public. Consequently, many composite sound walls have become expensive and complicated to manufacture, difficult to erect, and expensive to maintain.

Therefore, there is a need for a sound wall that can be formed of several components, yet will be securely bonded to any structural element while still remaining efficient to manufacture, erect and maintain.

SUMMARY OF THE INVENTION

These, and other objects are achieved by a monolithically fabricated sound absorbing structural precast panel. One form of the panel is comprised of a sound absorptive layer that is a blended mixture of expanded aggregate or natural aggregate or manmade aggregate, recycled granulated rubber or granulated rubber, chemically treated wood particles, cement, pozzolans, water, synthetic polypropylene/polyethylene Monofilament Fibers (optional), air entraining admixture, water reducing, set acceleration admixtures, set retarding admixtures, super plasticizers admixture. The mixture is placed in a form mold, compressed to a specific density, backed with reinforced structural concrete and cured. The result is a sound absorbing structural precast panel that is economical to manufacture, has a high noise reduction coefficient, high sound transmission coefficient, above average freeze-thaw durability, above average resistance to chemical attack and a Class A fire rating. Panel fabrication can be conducted at a manufacturing facility or at a construction site. The panel fabrication-placement processes can be preformed manually or mechanically. If preformed, manually the fabrication process does not require specialized placement tools. A modified mixture can include recycled HDPVC. Other modified mixtures can include water reducing admixtures, set retarding admixtures, set acceleration, super plasticizer admixtures and Synthetic polypropylene/polyethylene Monofilament Fibers.

The primary use of the sound absorbing noise barrier embodying the principles of the present invention is noise abatement for the transportation industry, such as highway, railway and mass transit. Additionally, the panel provides noise abatement for residential, commercial or industrial applications requiring a durable, low cost, sound absorbing noise barrier.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

DETAILED DESCRIPTION OF THE INVENTION

The principles of the present invention are embodied in a monolithically fabricated composite sound absorbing structural concrete noise barrier comprising a sound absorbing layer formed of specialized raw materials which is compressed to a specific density and bonded to a reinforced structural concrete layer.

Specifically, the sound absorbing layer is formed as follows (with all volume being based upon one cubic yard):
Sound absorbing mixture volume based upon 1 cubic yard.
Cement and Pozzolan: 19% to 30% by volume.
Normal weight or Lightweight Aggregate: 16%-23% by volume.
Wood particles: 15% to 22% by volume.
Granulated rubber: 19%-28% by volume.
Potable water: 8%-15% by volume.
Air entraining admixture: 5-40 oz per cubic yard.
Optional Ingredients Include:
Synthetic polypropylene/polyethylene Monofilament Fibers 0.5%-1.5% by volume.
Water reducing admixtures: 5-15 oz per cubic yard (optional).
Set Retarding Admixture: 5-15 oz per yard (optional).
Super plasticizer admixture: per manufactures dosage rate (optional)
Recycled High Density Polyvinyl Chloride (7% to 20% by volume)
Set Accelerating Admixtures: per manufacture dosage rate (optional)

The advantages associated with the optional ingredients include the following.

Synthetic Polypropylene/Polyethylene Monofilament Fibers:

The advantages of using synthetic polypropylene/polyethylene monofilament fibers in the Sound absorbing mixture is the maximum acoustic absorption coefficient increases for various frequencies from around 0.70 for a mixture with no fibers to around 0.90 for a mixtures fiber volume of 1.5%. The increased acoustical absorption is due to the fibers in the sound absorbing mixture bridging some of the larger pores. When sound waves pass through the open pore structure of the sound absorbing layer, they impinge on the fibers. Consequently, the path the sound waves travel is increased. A portion of the sound energy is lost in traveling around the fibers and another portion is lost in setting the fibers into vibration. The sound energy loss due to the interaction of both of these mechanisms is increased, resulting in increased acoustic absorption.

Water Reducing Admixtures.

Water reducing admixtures reduce the amount of mixing water used in the sound absorbing mixture without sacrificing the mixtures workability. In addition, reducing the mixing water results in the sound absorbing layer having increased compressive strength, increased flexural strength and improved freeze-thaw resistance.

Set Retarding Admixtures.

Set retarding admixtures are used when the temperature of the sound absorbing mixture exceeds 90 Degrees F. As the temperature of the sound absorbing mixture increases, the chemical hydration process of the cement is accelerated thus causing the mixture to set more rapidly and lose workability. Adding a set retarding admixture delays the cements hydration process and allows the mixture to have the workability characteristics of a normal mixture.

Super Plasticizers.

Super plasticizers, also known as plasticizers, are admixtures that allow large water reduction or greater flowability without substantially slowing set time. A Super Plasticizer can maintain a specific consistency and workability at a greatly reduced amount of water. Super plasticizers have a limited pot life and will lose their effectiveness. Dosages rates vary according to the particular brand and type of super plasticizer. When added to the sound absorbing mixture, super plasticizers produce a sound absorbing layer that gains strength faster that the standard sound absorbing mixture. Consequently, the time required to cure the sound absorbing panels is reduced and the panels can be removed from the forms in a shorter period of time. This improves production rates.

Unlike a set retarder that extends the setting time of a mixture, a super plasticizer maintains consistency and workability for a specific time and does not retard the set time of the sound absorbing admixture.

This is a substantial benefit when placing large quantities of the sound absorbing mixture quickly in a limited time period.

Recycled High Density Polyvinyl Chloride (HDPVC).

Recycled High Density Polyvinyl Chloride (HDPVC) is an environmental waste product that when recycled to a specific gradation and properly sized reduces the weight of the sound absorbing layer and enhances both the pore structure and interconnected channels within the sound absorbing layer. When recycled HDPVC is used in the sound absorbing mixture, it replaces an equal volume of stone aggregate. HDPVC may be an environmental problem, but large stockpiles are available for use throughout the world. Currently the demand for recycled HDPVC is less that the available supply.

Set Acceleration Admixture.

Set acceleration admixture is used in the sound absorbing mixture when the mixture temperature is 40 degrees Fahrenheit or less. At 40 degrees F., the heat from the chemical hydration of the cement and water slows, consequently, the sound absorbing layer's set time increases. An increase in set time delays the removal of the noise barrier panels from their forms. To lessen the impact of low mixture temperatures and maintain production levels, set accelerating admixtures are added to the sound absorbing mixture per the admixture manufactures recommended dosage rate.

Mixing the Sound Absorbing Mixture.

The sound absorbing mixture can be mixed in many different types of motorized mixers. A mixer must have a mixing speed and mixing capacity sufficient in size to completely mix the sound absorbing raw materials into a uniform consistency. Examples of different type of mixers suitable for mixing the sound absorbing mixture are mixers having a mixing action comprised of singular or dual rotating horizontal shafts, affixed to each horizontal shaft are arms with paddles that extend vertically into the mixture, or mixers having a rotating vertical shaft with numerous arms extending outward from the shaft, affixed to each arm and at different locations along each arm are paddles extending vertically into the mixture, or mixers having a horizontal shaft with a continuous spiral mixing screw attached to the shaft, or a mobile mixing unit capable of discharging the raw material into a screw type mixing auger.

The quantity of each raw material is determined either by weight or volume. The first raw materials introduced into the mixer are the stone aggregate, rubber granules, wood particles, fibers and any optional aggregate; these are mixed for 15-30 seconds. Second, the cement and Pozzolans are discharged into the mixer and mixed until uniformly blended. Third, the water and admixture are discharged into the mixture at a minimum water discharge rate of 2 gallons per second. The air entraining admixture is discharged into the water discharge line and discharged as the water is discharging. The remaining admixtures are discharged after the air entraining admixture has finished discharging. The raw materials are mixed or a minimum of two (2) minutes. At the end of the 2 minute mixing cycle, a check is made that the sound absorbing mixture has the correct consistency and is uniformly blended. If the mixture is not uniformly blended, it should be mixed for an additional 1-2 minutes.

The present invention is a sound absorbing precast panel consisting of a sound absorbing layer comprised of the ingredients listed herein and bonded to a layer of reinforced structural lightweight or normal weight concrete. A plurality of plastic or metal units support and position the reinforcement at designated heights within the structural layer. Various sizes of reinforcement mesh or bars comprised of metal or fiber glass or carbon fiber are placed individually or in combination on the supporting units. The supporting units rest upon the compacted sound absorbing layer.

The stone aggregate, granulated rubber particles and chemically treated wood particles used in the sound absorbing layer of the present invention are binary blends of specific sizes. Blending specific sized stone aggregates, rubber particles and chemically treated wood particles increases the porosity of the sound absorbing layer and the durability of the product.

Additionally, binary blends of stone aggregate, granulated rubber and chemically treated wood particles increase the number of interconnected channels within the sound absorbing layer that sound waves travel through. Binary blending of stone aggregate, granulated rubber and chemically treated wood particles also increases the tortuosity within the interconnected sound absorbing channels, thus more sound energy is absorbed.

The increased porosity and increased number of interconnected channels improves the durability of the sound absorbing layer. Most sound absorbing products known to the inventor have difficulty expelling water quickly from the sound absorbing layer. Thus, many of the existing sound absorbing noise barriers lack long term durability and deteriorate in climates that experience numerous free/thaw cycles. The present invention binary blending of stone aggregate, granulated rubber and chemically treated wood particles increases the porosity and the number of interconnected channels; consequently moisture or water within the sound absorbing layer is expelled from the sound absorbing layer at rate of 21 gallons per minute. This represents a 40% increase in the amount moisture expelled from similar sound absorbing products. The faster water is expelled from a sound absorbing layer the less opportunity moisture has to freeze and expand within the pores and interconnected channels of the sound absorbing layer. Moisture that is trapped within the sound absorbing layer freezes and is the primary reason sound absorbing noise barriers deteriorate. As the moisture freezes, excessive internal pressure may be created which may cause the sound absorbing mass to break apart and fail when undergoing numerous freeze-thaw cycles. The product embodying the teaching of the present invention has been tested per ASTM Standard 666, Method A (Method for testing the Freeze-Thaw resistance of concrete) and has exhibited excellent free-thaw resistance.

The natural aggregate, expanded aggregate, man-made aggregate, lightweight aggregate, granulated rubber and wood particles are binary blends of specific sizes designed to create a void content within the sound absorbing layer that ranges between 15% to 38% voids. The void content is enhanced and optimized by controlling the gradation, the size and the quantity of the various aggregates, granulated rubber, chemically treated wood particles and optional recycles HDPVC.

The product of the present invention uses chemically treated wood particles to replace a percentage of the stone aggregate. One advantage of replacing the stone aggregate with chemically treated wood particles is the weight of the sound absorbing panel decreases. Stone aggregate weights can range from an average weight of about 45 lbs per cubic foot for lightweight aggregate to an aggregate weight of about 100 lbs per cubic foot for regular aggregate. Wood particles weigh about 10 lbs per cubic foot. In one (1) cubic yard of sound absorbing mixture, so the chemically treated wood particles can replace 4 to 6 cubic foot of stone aggregate. Depending upon the type of stone aggregate that is replaced with wood fiber the weight reduction can be from 180 lbs to 600 lbs per cubic yard. An 8'×20' panel requires 2 cubic yards of sound absorbing mixture this could reduce the weight 360 lbs to 1200 lbs per panel.

Using wood granules or fibers in the sound absorbing mixture enables the manufacturer to cast noise barrier panels having a very detailed sound absorbing surface. Wood chips are flexible and can bend and conform to the detail of a formliner. As used herein, formliner detail is the pattern of a premolded formliner replicating a look of brick, block, stone or a ribbed pattern, etc. Each pattern has its own unique corners, edges and irregularities. The sound absorbing mixture must be able to conform to and recreate the pattern. Due to the flexibility of the wood granules, more definition and detail can be achieved with the addition of wood granules than with a mixture of granulated rubber and stone aggregate. As used herein, a formliner is a rubber, or plastic liner that is placed at the bottom of the form and creates the face of a panel.

Another advantage of using chemically treated wood particles is that unlike stone aggregate and granulated rubber, wood particles are fibrous. The fibrous nature of wood makes wood particles natural sound absorbers. A stone aggregate and granulated rubber mixture creates channels that dissipates sound energy and absorb noise. However, the stone aggregate also reflects noise. Replacing a percentage of stone aggregate with chemically treated wood particles decreases the amount of reflected sound energy and increased sound absorption. An additional advantage of using chemically treated wood particles is the wood particles create additional tortuosity within the interconnected sound absorbing channels. Increasing the tortuosity within the interconnected sound absorbing channels dissipates additional sound energy. Consequently, using chemically treated wood particles in the sound absorbing layer increases the amount of absorbed sound energy.

As mentioned above, the bond between the sound absorbing layer and the structural concrete layer is very critical. If the bond between the layers is weak the sound absorbing layer can dislodges from the structural concrete layer. Failure of the bond is dangerous because large pieces of the sound absorbing layer may fall and endanger the general public.

Products using a cement binder mixed with only chemically treated wood particles to create a sound absorbing layer must place the structural concrete onto the sound absorbing layer before the sound absorbing layers cement hydrates. This is because the chemical reaction of the sound absorbing layers cement and the structural concrete layers cement must hydrate together to create a strong bond between the layers. If the time between of the sound absorbing layer and placement of the structural concrete is delayed due to a plant break down or fabrication problem the sound absorbing layer will hydrate before placement of the structural layer. Consequently, the bond between the layers will lack strength. To avoid this problem, some government agencies have required sound absorbing panels manufactured with only chemically treated wood particles and a cement binder to insert stainless steel connectors that extend into the sound absorbing layer and into the structural concrete layer. The stainless steel connector acts as a secondary way to bond each layer together should the chemically bond be inferior or fail.

The primary bond between the sound absorbing layer of the product embodying the present invention and the structural concrete layer uses the porosity of the sound absorbing layer to securely bond each layer together. Due to the large number of ⅛" to ¼" sized pores distributed across the entire sound absorbing layer a strong bond is created when the structural concrete is placed upon the sound absorbing layer.

This type of bond is not dependent upon the chemical hydration of the cement and water in each layer to bond the layers together. Consequently, the structural concrete layer can be placed upon the sound absorbing layer a day, week, or month later and the panel manufacturer can be assured the bonding of the two layers is strong. Additionally, since the bond between the layers of the present invention is not time critical, the sound absorbing noise barrier panels do not have to be manufactured in a controlled environment. Panels can be manufactured indoors or outdoors or at a construction site.

Furthermore, the sound absorbing layer of the present invention can be placed manually using simple, low cost, readily-available tools. Expensive specialized placement equipment is not required to manufacture sound absorbing noise barriers, thereby making small sound absorbing noise barrier projects economical to manufacture. The present invention may enable more manufactures to manufacture sound absorbing noise barriers. This may stimulate competition and thereby reduce the cost of sound absorbing noise barriers.

Forming.

The present invention is fabricated in forms that are sized according to each sound absorbing panel's depth, length and width as indicated by the job specifications of the project being manufactured. The forms include a plurality of perimeter side forms, supporting base form, bulkheads and hardware used to secure the perimeter side form, bulkheads, and base forms together. The perimeter side forms are constructed of strong, ridged, non bending materials. Examples of perimeter side form materials are steel, wood, fiberglass, etc. The side forms are placed upon a ridged non-bending base designed to support the weight of the loads imposed upon the base throughout the fabricating process. The perimeter side forms are configured to the correct dimensions and secured to the base form using removable attaching hardware. If a formliner design is required, a formliner is placed inside the perimeter form work on top of the base form. After the formliner is in place, the inside area of the form assembly is lightly spray with an approved form release chemical. The form assemblies are then complete.

Because the present invention's sound absorbing surface has an abundance of pores, formliners do not need to be secured permanently to the base form. Normally if a formliner is not permanently secured to the base form when the sound absorbing panel is removed from the form, the suction created between the formliner and the sound absorbing surface pulls the formliner from the base form and causes it to stick to the sound absorbing surface. The advantage of securing the formliner to the base form is that different formliners can be installed onto the base form quickly without losing valuable production time. Another advantage of the present invention is it reduces formliner cost.

Formliners are expensive and have limited useful lives. Because of the present invention's increased surface porosity, the number of times a formliner can be used is increased. Using the teaching of the present invention, the useful life of a formliner can be increased from two hundred to four hundred uses. This represents a large cost saving when considering the average formliner cost ranges from $22.00-$36.00 a square foot.

It is noted that an additional advantage to the present invention is realized in some geographic regions where locating correctly sized and graded lightweight aggregate is difficult. In these situation the lightweight aggregate may have to be used. Consequently, using this type of lightweight aggregate decreases the interconnected void structure within the sound absorbing mass. To offset the decrease in voids and restore the interconnected void structure to the proper content, additional quantities of wood particles may be added to the sound absorbing mixture. Blending the extra wood particles with the lightweight aggregate creates additional voids and restores the inter connected voids content to the volume of voids needed for efficient sound absorption.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method of forming a monolithic sound absorbing structural precast panel comprising:
   A) providing a sound absorptive layer that is a blended mixture wherein the blended mixture is selected from the group consisting of expanded aggregate, natural aggregate, and manmade aggregate; the mixture further including granulated rubber, chemically treated wood particles, cement, pozzolans, water, air entraining admixture, and water reducing mixture;
   B) placing the sound absorptive layer ingredients in a form mold;
   C) compressing the ingredients to a preset density;
   D) backing the compressed ingredients with reinforced structural concrete; and
   E) curing the backed and compressed ingredients.

* * * * *